(12) United States Patent
Law et al.

(10) Patent No.: US 8,029,413 B2
(45) Date of Patent: Oct. 4, 2011

(54) WHEEL ASSEMBLY FOR TRAMPOLINES

(76) Inventors: Peter James Law, Port Coquitlam (CA); Richard Allen Mueller, Port Coquitlam (CA)

(*) Notice: Subject to any disclaimer, the term of this patent is extended or adjusted under 35 U.S.C. 154(b) by 0 days.

(21) Appl. No.: 12/522,140

(22) PCT Filed: Oct. 31, 2007

(86) PCT No.: PCT/CA2007/001948
§ 371 (c)(1), (2), (4) Date: Jul. 21, 2009

(87) PCT Pub. No.: WO2008/086591
PCT Pub. Date: Jul. 24, 2008

(65) Prior Publication Data
US 2010/0041519 A1 Feb. 18, 2010

Related U.S. Application Data

(60) Provisional application No. 60/885,193, filed on Jan. 16, 2007.

(51) Int. Cl.
*A63B 21/00* (2006.01)
(52) U.S. Cl. ............................................. 482/27; 482/28
(58) Field of Classification Search .............. 482/26–29, 482/35; 254/425, 424, 418; 248/674
See application file for complete search history.

(56) References Cited

U.S. PATENT DOCUMENTS

| | | | |
|---|---|---|---|
| 1,007,022 A | 10/1911 | Doll | |
| 1,019,302 A | 3/1912 | Butcher | |
| 1,145,096 A | 7/1915 | Thomas | |
| 1,193,052 A | 8/1916 | Pirsch | |
| 1,556,735 A | 10/1925 | Tiffany | |
| 1,730,788 A | 10/1929 | Simon | |
| 3,116,809 A | 1/1964 | Nissen | |
| 3,156,318 A | 11/1964 | Sorenson et al. | |
| 3,303,905 A | 2/1967 | Nissen et al. | |
| 3,580,570 A * | 5/1971 | Fenner et al. | 482/28 |
| 3,841,663 A * | 10/1974 | Proffit | 280/475 |
| 3,934,852 A | 1/1976 | Weber et al. | |
| 4,249,282 A | 2/1981 | Little | |
| 4,589,632 A * | 5/1986 | Smith | 254/418 |
| 4,623,125 A * | 11/1986 | Ebey | 254/420 |

(Continued)

FOREIGN PATENT DOCUMENTS

CA 2375758 A1 9/2002

(Continued)

OTHER PUBLICATIONS

International Search Report, mailed Feb. 14, 2008, issued in respect of Patent Cooperation Treaty Patent Application No. PCT/CA2007/001948 (PCT Publication No. WO 2008/086591).

(Continued)

*Primary Examiner* — Jerome w Donnelly
(74) *Attorney, Agent, or Firm* — Oyen Wiggs Green & Mutala, LLP

(57) ABSTRACT

A wheel assembly for attachment to the leg of a trampoline has means for moving the wheel from a first raised position where the wheel is not supporting the trampoline leg above the ground, to a second position where the wheel is supporting the trampoline leg above the ground. In that way the trampoline can be rolled on wheels without having to subsequently remove the wheel assemblies for storage.

16 Claims, 17 Drawing Sheets

U.S. PATENT DOCUMENTS

| | | | | |
|---|---|---|---|---|
| 5,067,692 A | * | 11/1991 | Nudd et al. | 254/420 |
| 5,425,523 A | * | 6/1995 | Madey et al. | 248/466 |
| 6,302,381 B1 | | 10/2001 | Roll | |
| 6,439,545 B1 | * | 8/2002 | Hansen | 254/420 |
| 7,611,160 B1 | * | 11/2009 | Ignacio | 280/475 |
| 7,621,356 B2 | * | 11/2009 | Quarberg | 180/12 |

FOREIGN PATENT DOCUMENTS

| | | |
|---|---|---|
| GB | 1034209 | 6/1966 |

OTHER PUBLICATIONS

International Preliminary Report on Patentability dated May 13, 2009, issued in respect of Patent Cooperation Treaty Patent Application No. PCT/CA2007/001948 (PCT Publication No. WO 2008/086591).

\* cited by examiner

WHEEL ASSEMBLY FOR TRAMPOLINES

TECHNICAL FIELD

The invention relates to wheel assemblies for moving trampolines.

BACKGROUND

Many homes have a trampoline set up for use by family members, typically on a backyard lawn surface. Such trampolines are typically supported on opposed U-shaped legs, but the size, shape and number of legs is highly variable depending on the manufacturer, size and shape of the trampoline. To avoid having the grass under the trampoline die, and to permit the grass to be cut, it is necessary to periodically move a trampoline which is set up on a user's lawn. This is usually done by lifting or dragging the trampoline, which is difficult for a person to do alone.

It is known to attach wheel assemblies to trampolines to facilitate moving them. It is known to provide a pair of wheel assemblies, each having two or three wheels. The wheel assemblies are designed for indoor use, such as in gymnasia. Such wheel assemblies are designed to fit into receptacles provided in the trampoline frame when the trampoline is moved, and are removed when the trampoline is ready to be used. Examples are shown in U.S. Pat. Nos. 3,116,809 and 3,156,318. Such assemblies are difficult to store when the trampoline is in use, and not all trampoline designs may be suited or adapted to have one of these assemblies attached to it.

There is therefore a need for a wheel assembly which can be used on any design of trampoline and which can remain attached to the trampoline during use.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with apparatus which are meant to be exemplary and illustrative, not limiting in scope. In various embodiments, one or more of the above-described problems have been reduced or eliminated, while other embodiments are directed to other improvements.

The invention therefore provides a wheel assembly for attachment to a trampoline leg to enable a trampoline to be rolled on a surface, comprising: i) an attachment element having means for securing the wheel assembly to a trampoline leg; ii) an elongated element mounted on the attachment element and movable in a direction having a component perpendicular to the surface; iii) an axle-mounted wheel pivotally connected to the elongated element; and iv) means for reversibly moving the elongated element from a first position in which the wheel is raised relative to the attachment element to a second position in which said wheel is lowered relative to the attachment element.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
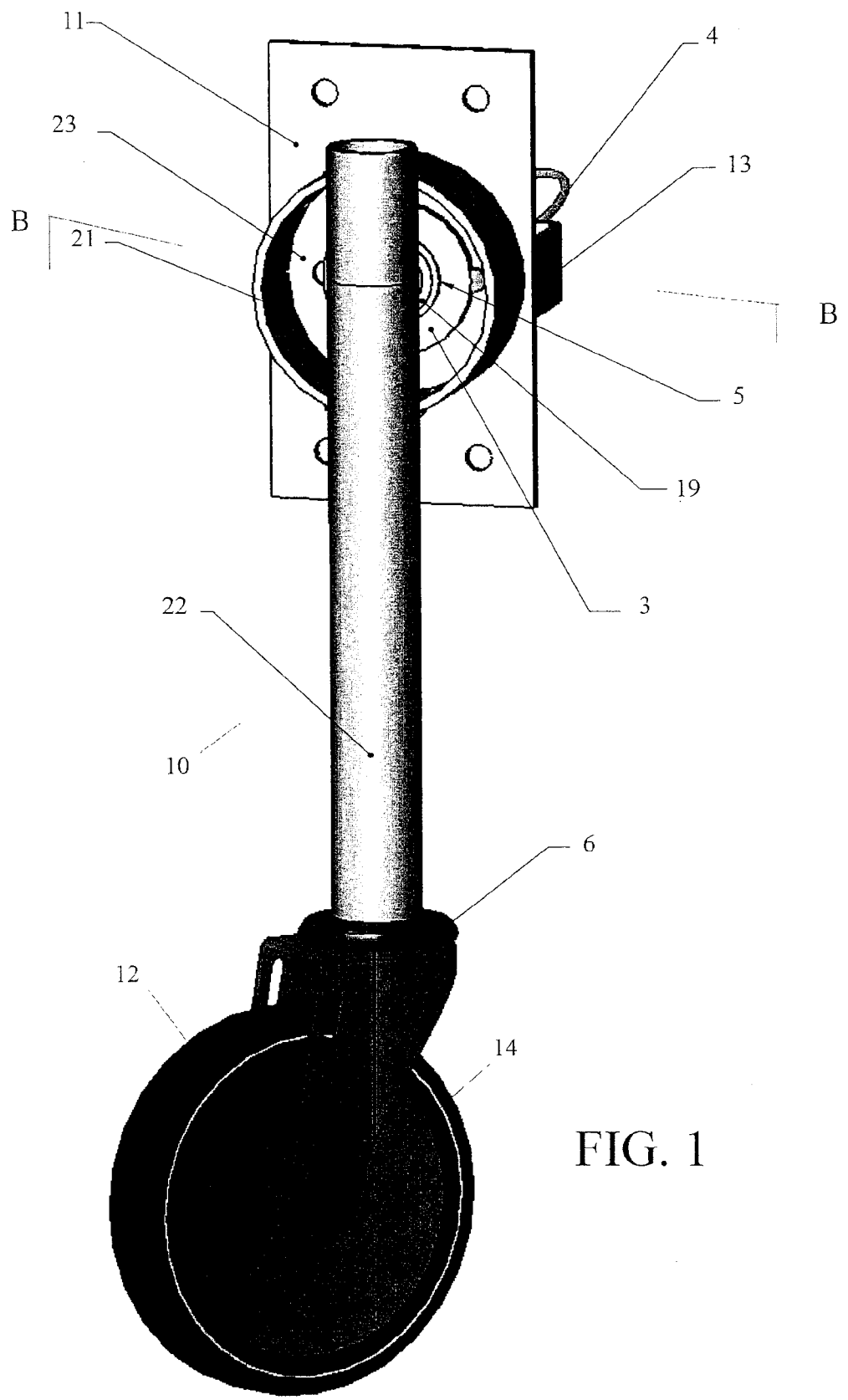
FIG. 1 is a front perspective view of a first embodiment of the invention.
Figure 2:
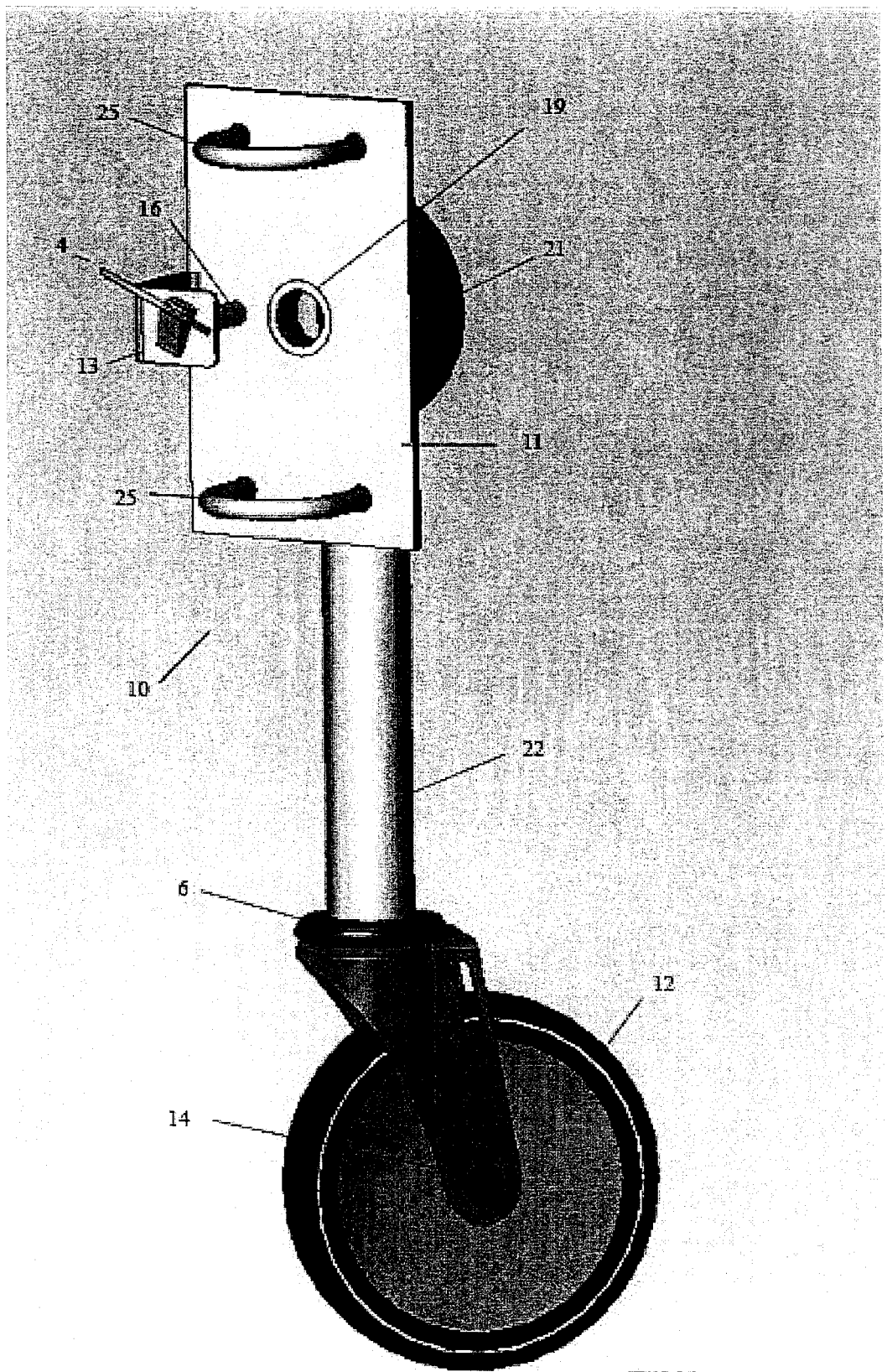
FIG. 2 is a rear perspective view of the embodiment shown in FIG. 1.

With reference to FIG. 1, a first embodiment of the pivoting wheel assembly is designated by numeral 10. It comprises a leg 22, which may be a hollow tube for lightness, for example manufactured from aluminum. Wheel 12 is mounted on axle 14 which is carried on caster 6 which is rotatably secured on the lower end of leg 22. The upper end of leg 22 is fastened, for example by welding, to rotating ring 21 which is mounted for rotation on cylindrical hub 19. Hub 19 is fixed to base plate 11. Rotating ring 21 is fastened, for example by welding, to ring plate 23 which is retained on hub 19 by retaining ring 5 and washer 3. Ring plate 23 has two holes 17 which are sized to receive retractable pin 16. Pin 16 slides in holes 18 of pin bracket 13 and plate 11. Pin 16 is biased into holes 17 by a spring 15 and has secured to its outer end a pin ring 4 to permit the user to withdraw the end of pin 16 from hole 17.

Figure 3:
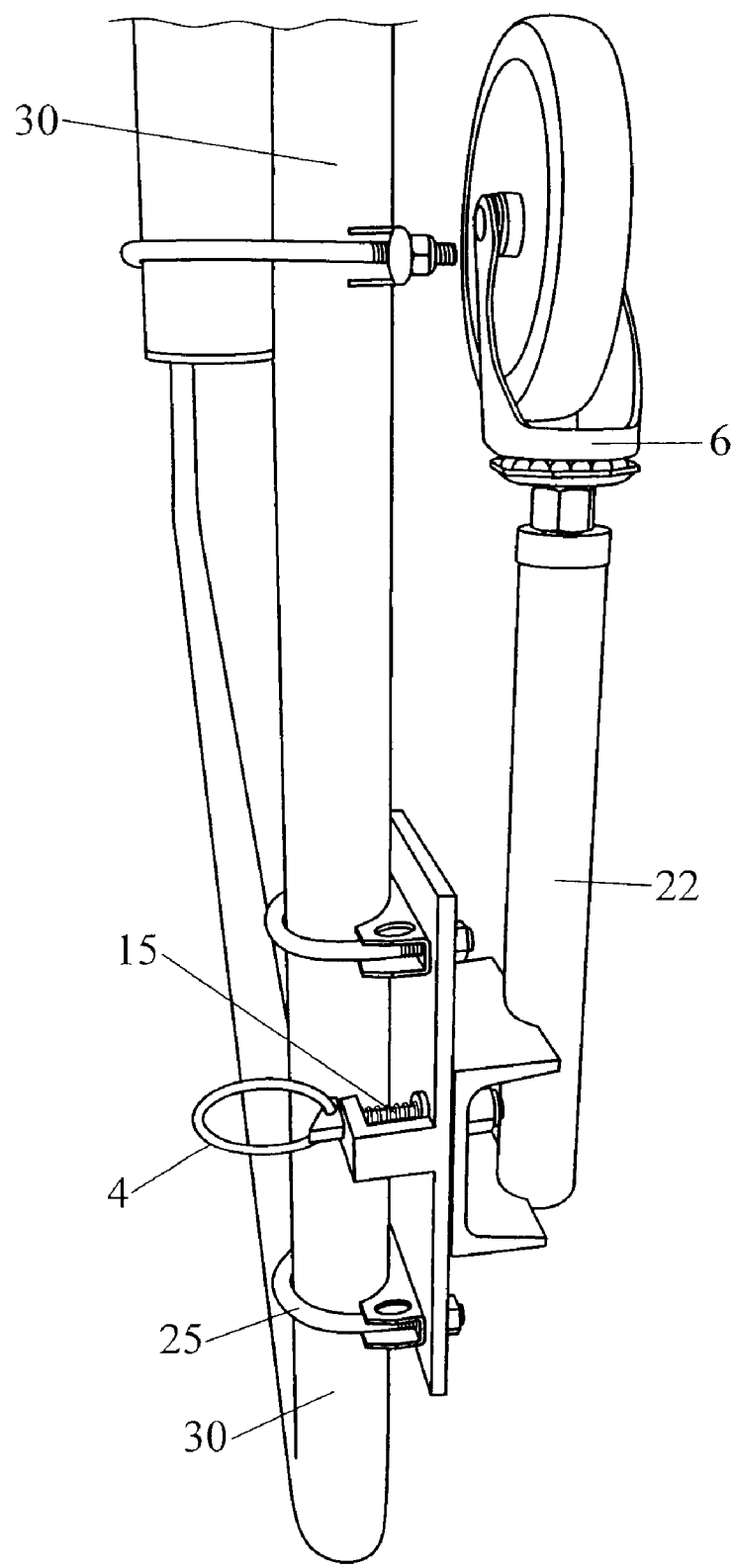
FIG. 3 is a perspective view of the embodiment shown in FIG. 1 attached to a trampoline leg in the wheel up position.
Figure 4:
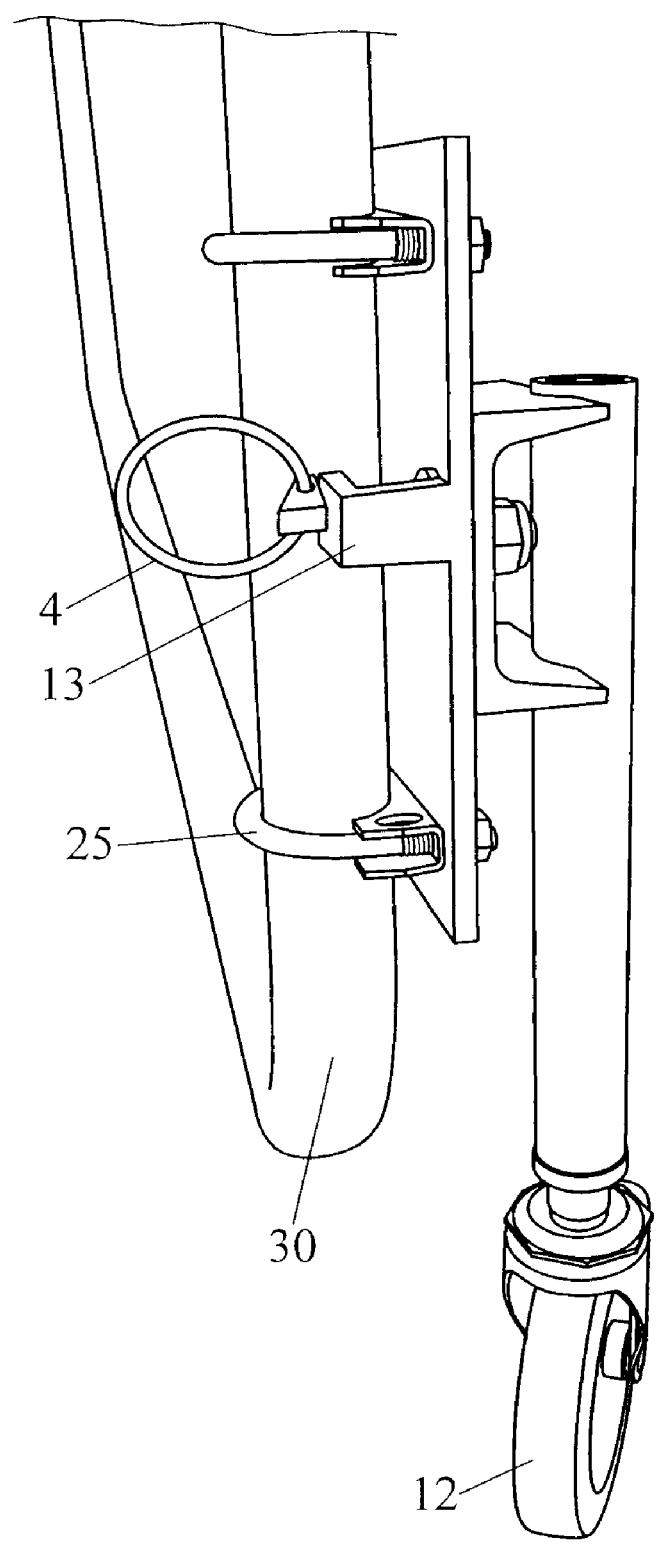
FIG. 4 is a perspective view of the embodiment shown in FIG. 1 attached to a trampoline leg in the wheel down position.
Figure 5:
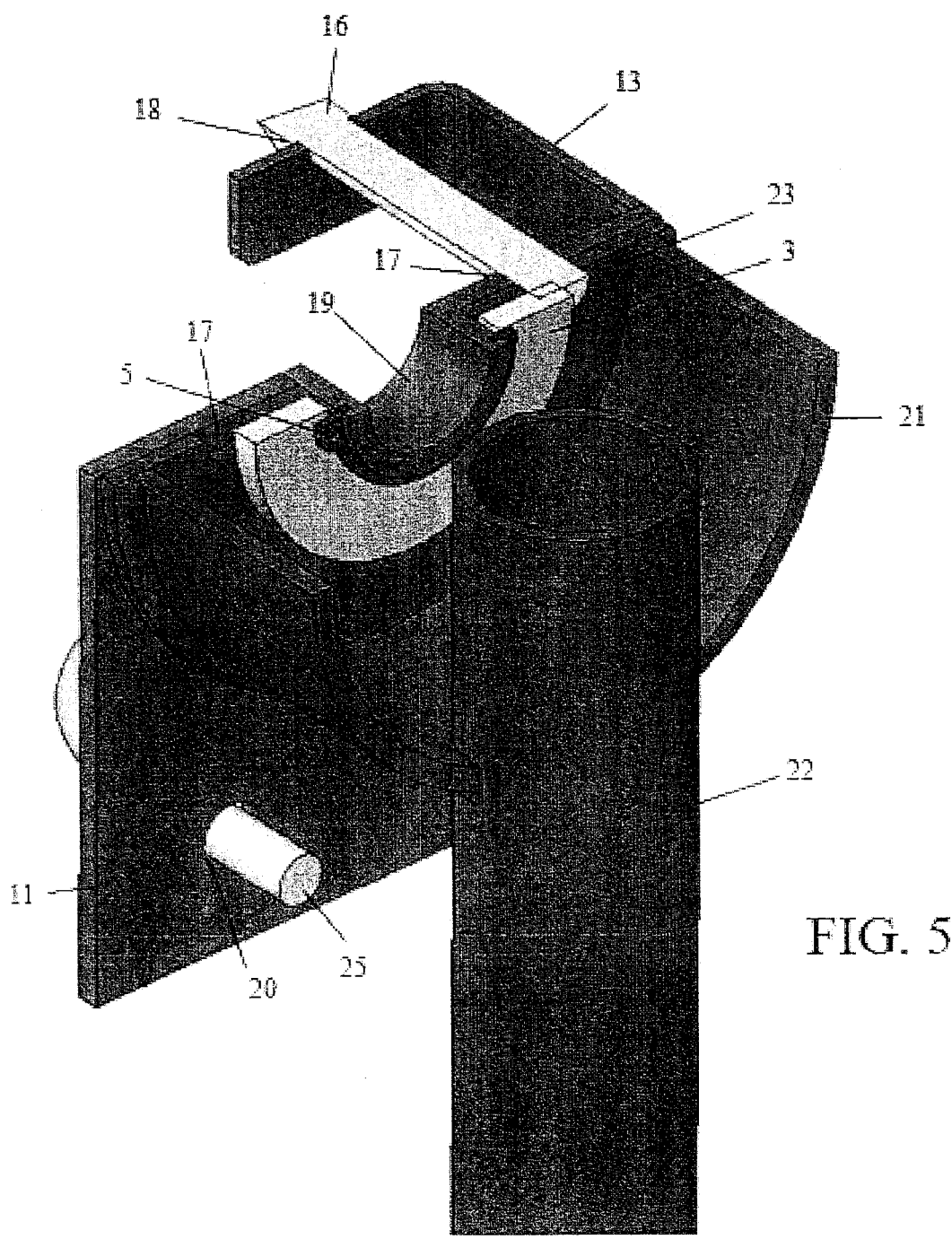
FIG. 5 is a cross-section perspective view taken along line B-B of FIG. 1.
Figure 6:
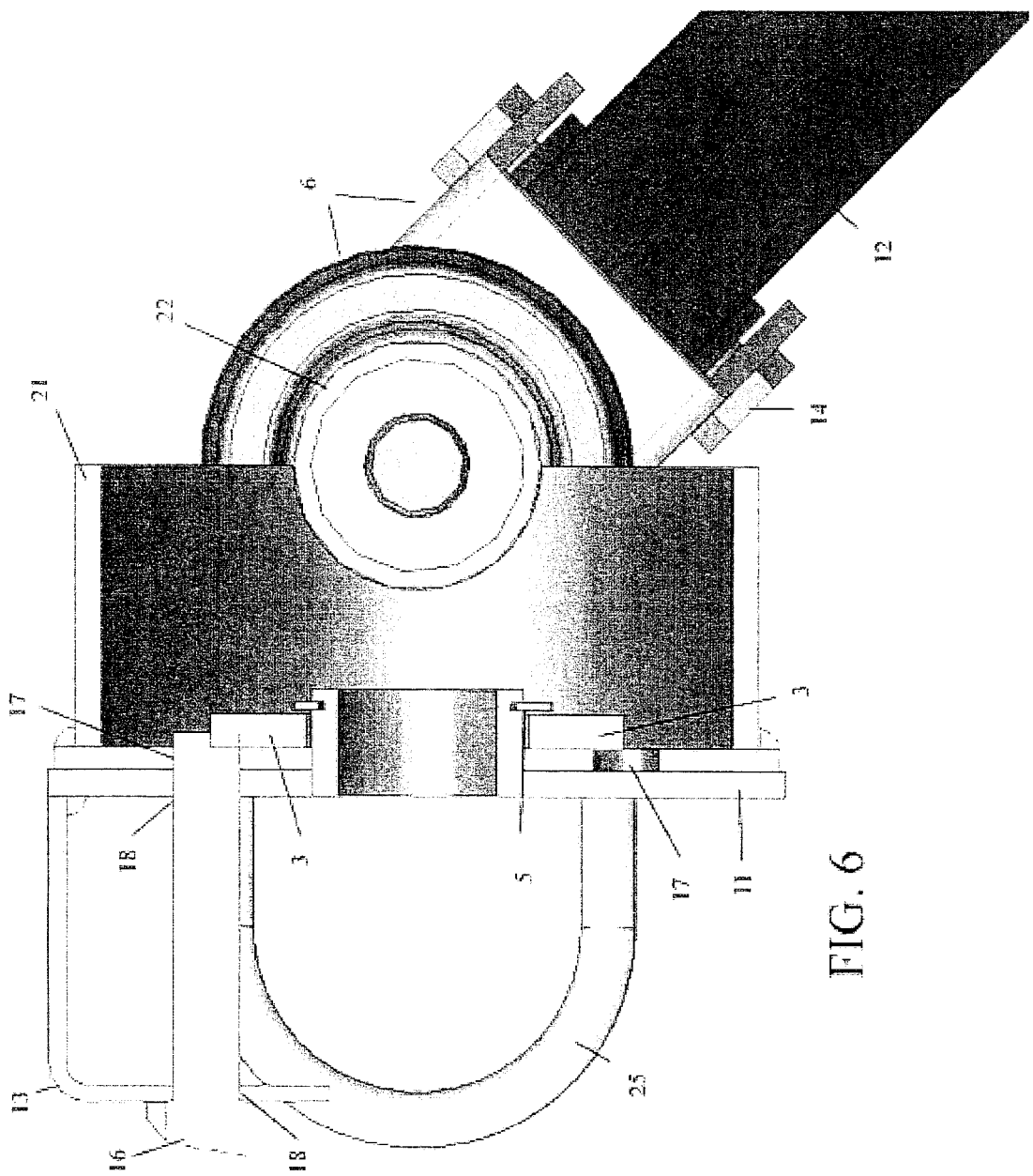
FIG. 6 is a top cross-section view taken along line B-B of FIG. 1.

Base plate 11 has holes 20 through which are removably secured U-shaped clamps 25 which have threaded ends for securing in holes 20 using threaded nuts. To use the device, as shown in FIG. 3, with the leg in the wheel up position shown, the base plate 11 is secured to trampoline leg 30 at the appropriate height by clamps 25. When it is desired to move the trampoline, the user pulls pin 16 out of hole 17 using pin ring 4, which permits rotating ring 21 and leg 22 to rotate. By raising the trampoline leg slightly, leg 22 is rotated 180 degrees so that pin 16 snaps into the second hole 17 and the trampoline leg 30 is then supported on wheel 12 above the ground, as shown in FIG. 4. Preferably a minimum of two or three wheel assemblies 10, and most preferably four wheel assemblies 10 are thus attached to the trampoline legs at spaced locations and when all the wheels are in the down position the trampoline can be readily rolled to a new location. When it is desired to set the trampoline down for use at a location, the process is reversed by the user pulling pin ring 4 to allow the leg 22 to rotate back to the wheel up position. The wheel assemblies 10 can remain on the trampoline legs in the wheel up position without disturbing the use of the trampoline.

A second embodiment of the pivoting wheel assembly is designated by numeral 70 in FIGS. 7 through 10. Wheel and pivoting caster assembly 82 is mounted on the end of lever 75 which has grip 74. Lever 75 is fastened, for example by welding, to bushing 80 which rotates on axle 81, 83, 85 which is fixed to base plate 78. Bushing 80 is welded to locking ring 84 which has holes 72 for receiving a locking pin 73. Pin 73 is biased into holes 72 by a spring (not shown) and has a handle end 76 which slides in housing 86. Base plate 78 has holes for removably receiving U-shaped clamps 77, 79.

Figure 7:
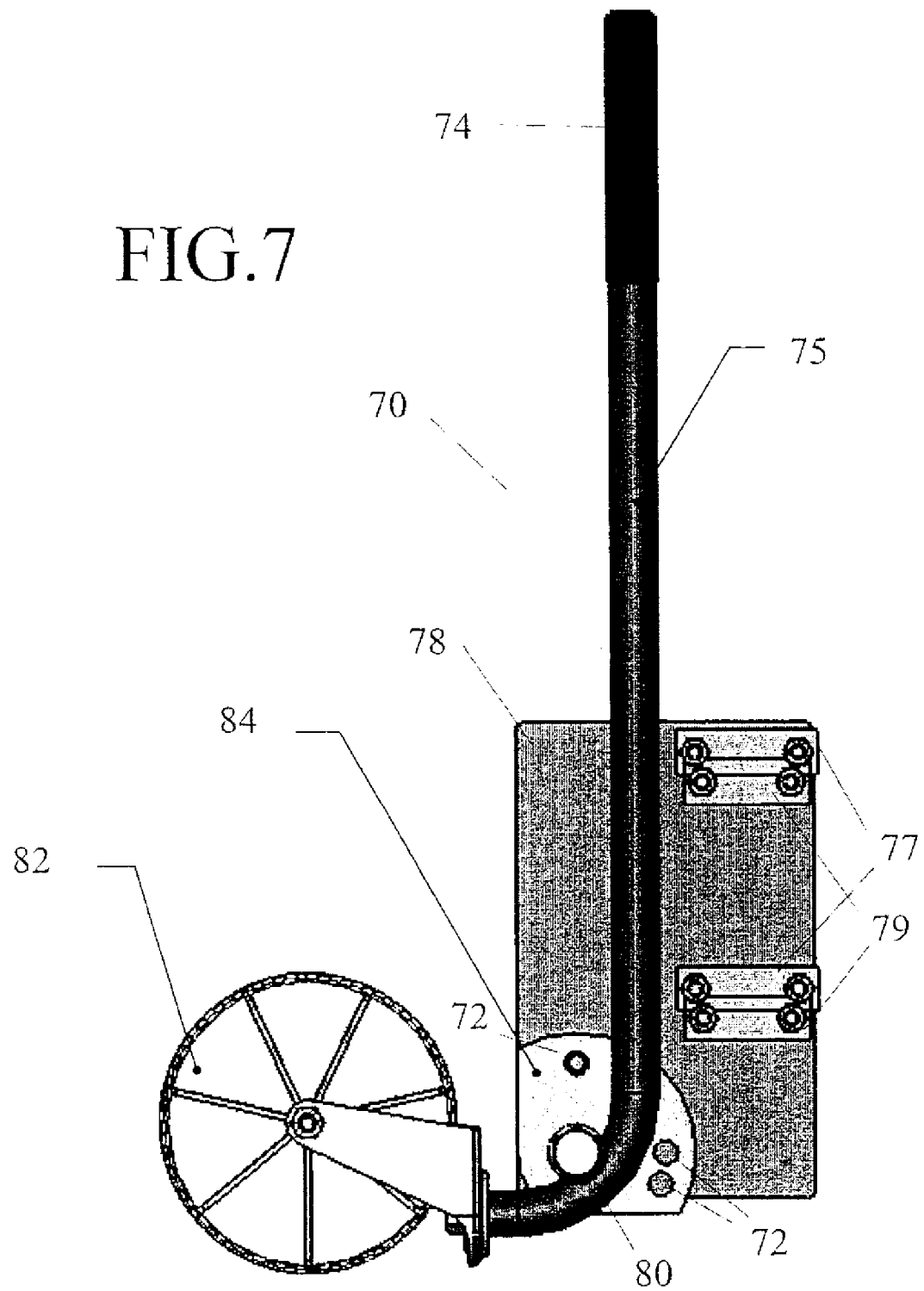
FIG. 7 is a front elevation view of a second embodiment of the invention.
Figure 8:
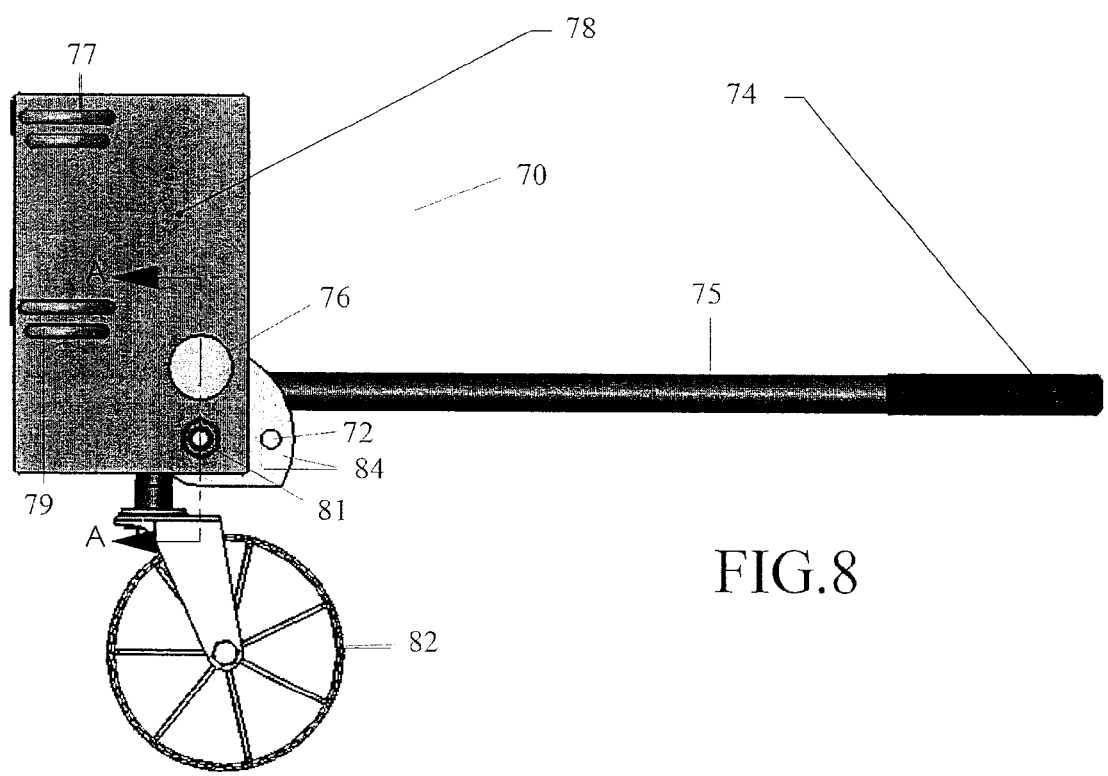
FIG. 8 is a rear elevation view of the embodiment shown in FIG. 7 in the wheel down position.
Figure 9:
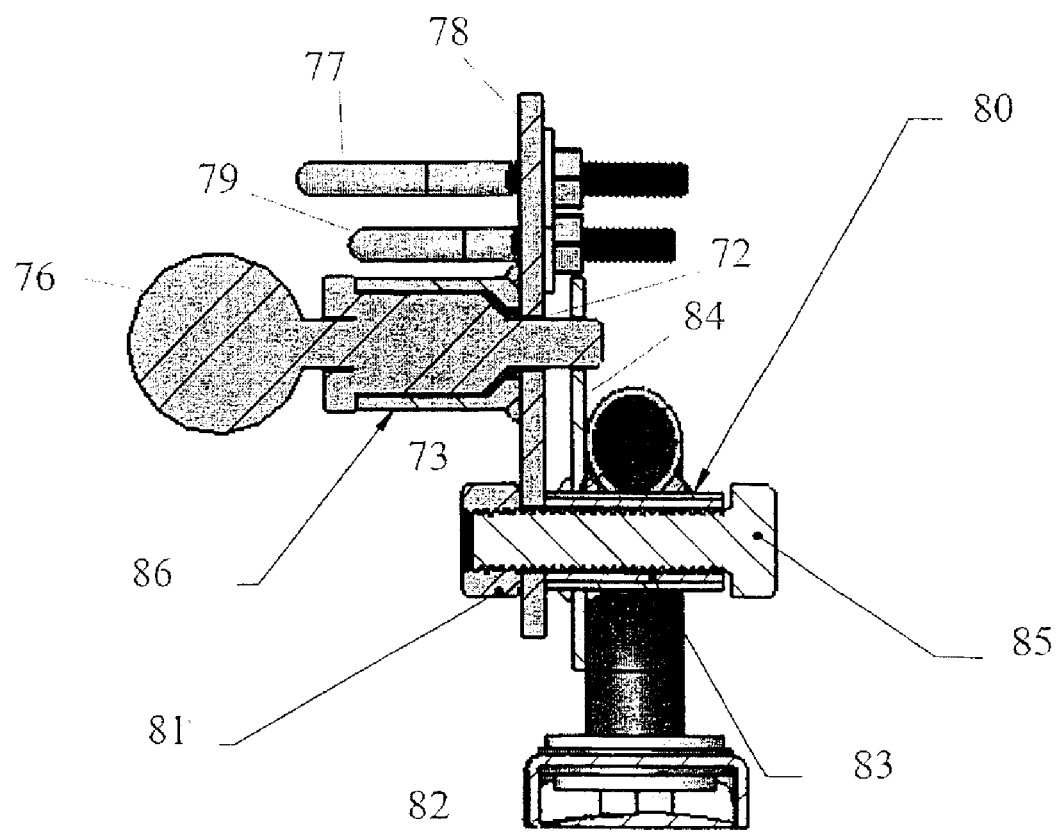
FIG. 9 is a cross-section view taken along line A-A of FIG. 8.
Figure 10:
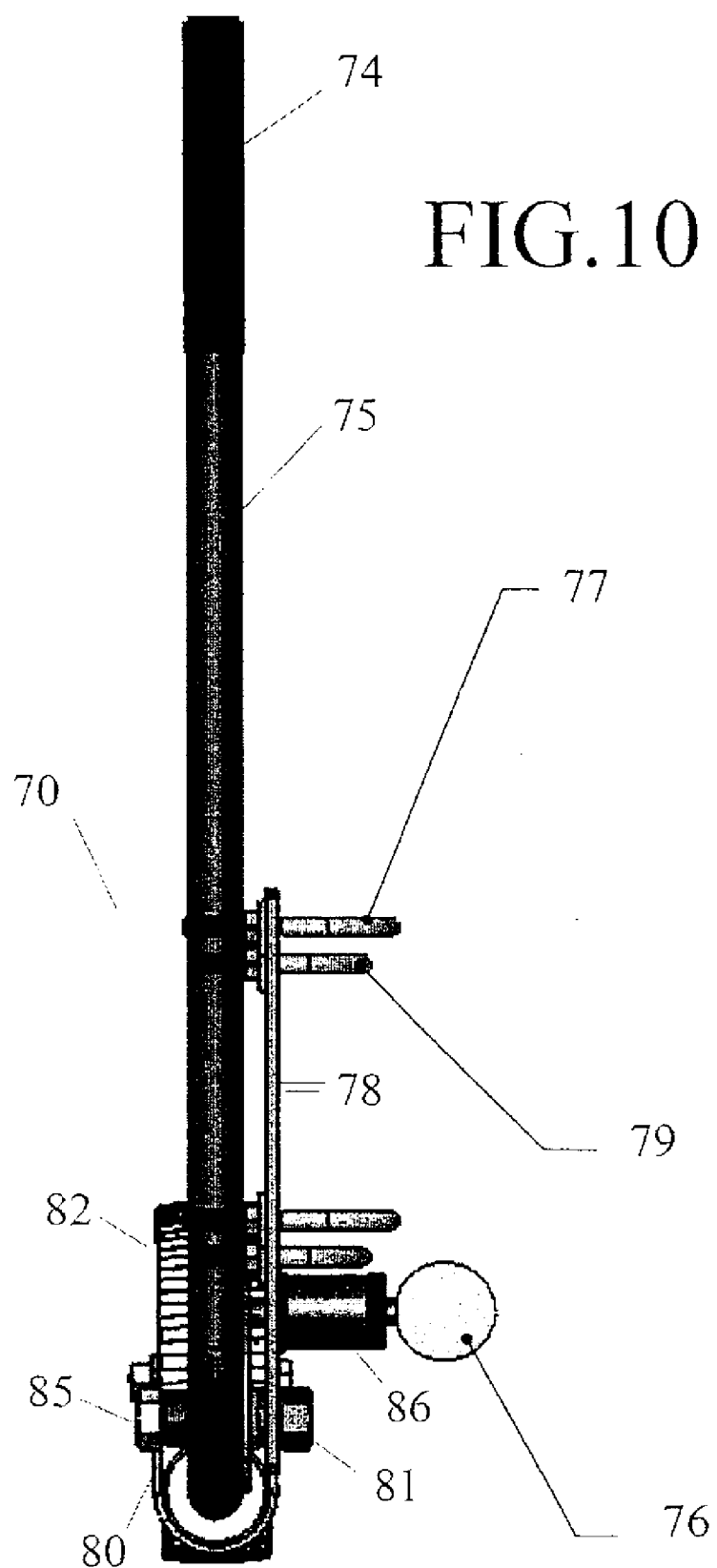
FIG. 10 is a top view of the embodiment shown in FIG. 8 in the wheel down position.

To use this embodiment, as in the first embodiment, with the lever 75 in the wheel up position shown in FIG. 7, the base plate 78 is secured to trampoline leg 30 at the appropriate height by clamps 77, 79. When it is desired to move the trampoline, the user pulls pin 73 out of hole 72 using handle 76, which permits rotating ring 84 and lever 75 to rotate. By raising the trampoline leg slightly, lever 75 is rotated 90 degrees to the position shown in FIG. 8 so that pin 73 snaps into a second hole 72 and the trampoline leg 30 is then supported on wheel 82 above the ground. Preferably four wheel assemblies 70 are thus attached to the trampoline legs at four locations and when all the wheels are in the down position the trampoline can be readily rolled to a new location. When it is desired to set the trampoline down for use at a location, the process is reversed by the user pulling out pin 73 and rotating lever 75 back ninety degrees to the wheel up position. The wheel assemblies 70 can remain on the trampoline legs in the wheel up position.

Figure 11:
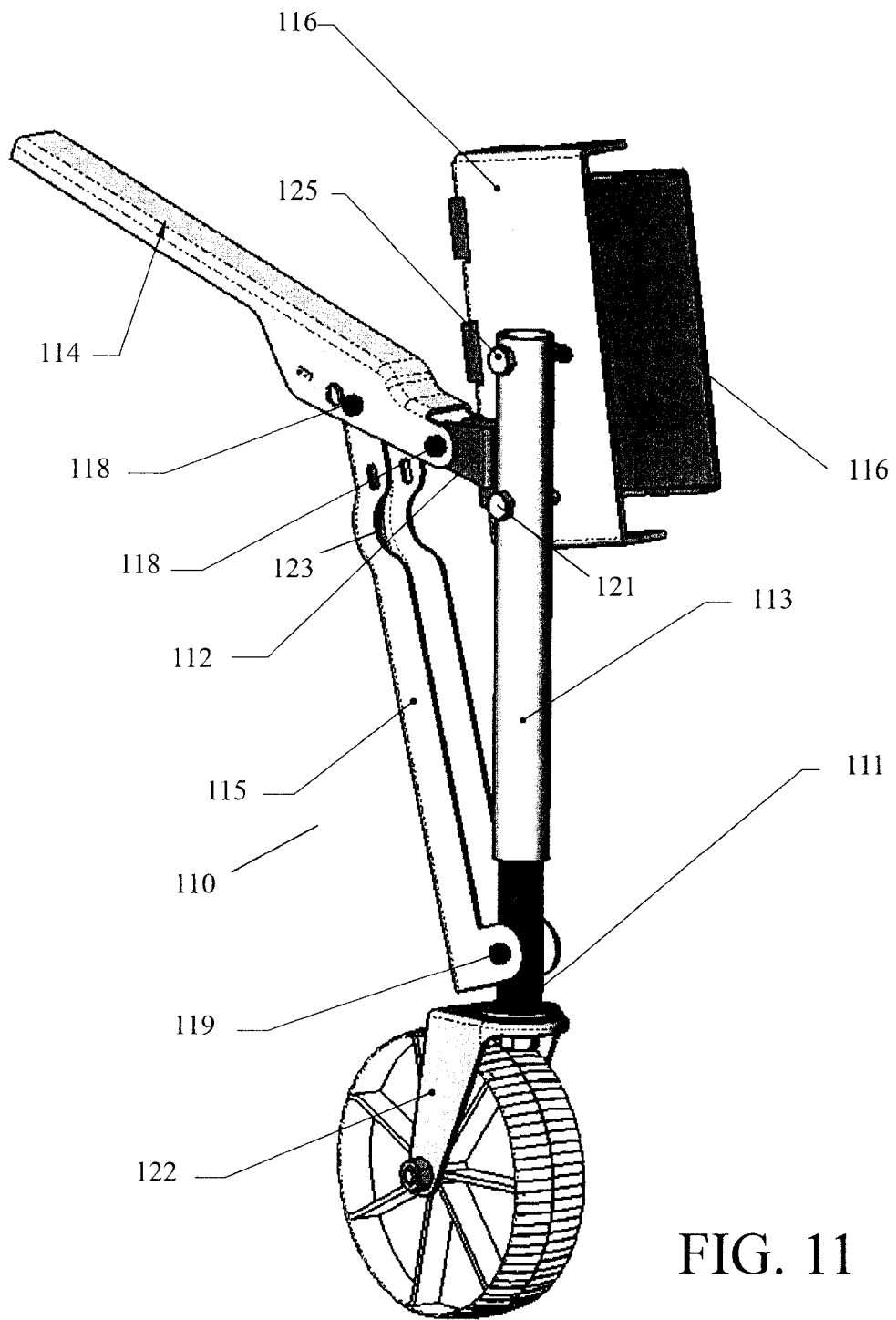
FIG. 11 is a perspective view of a third embodiment of the invention.
Figure 14:
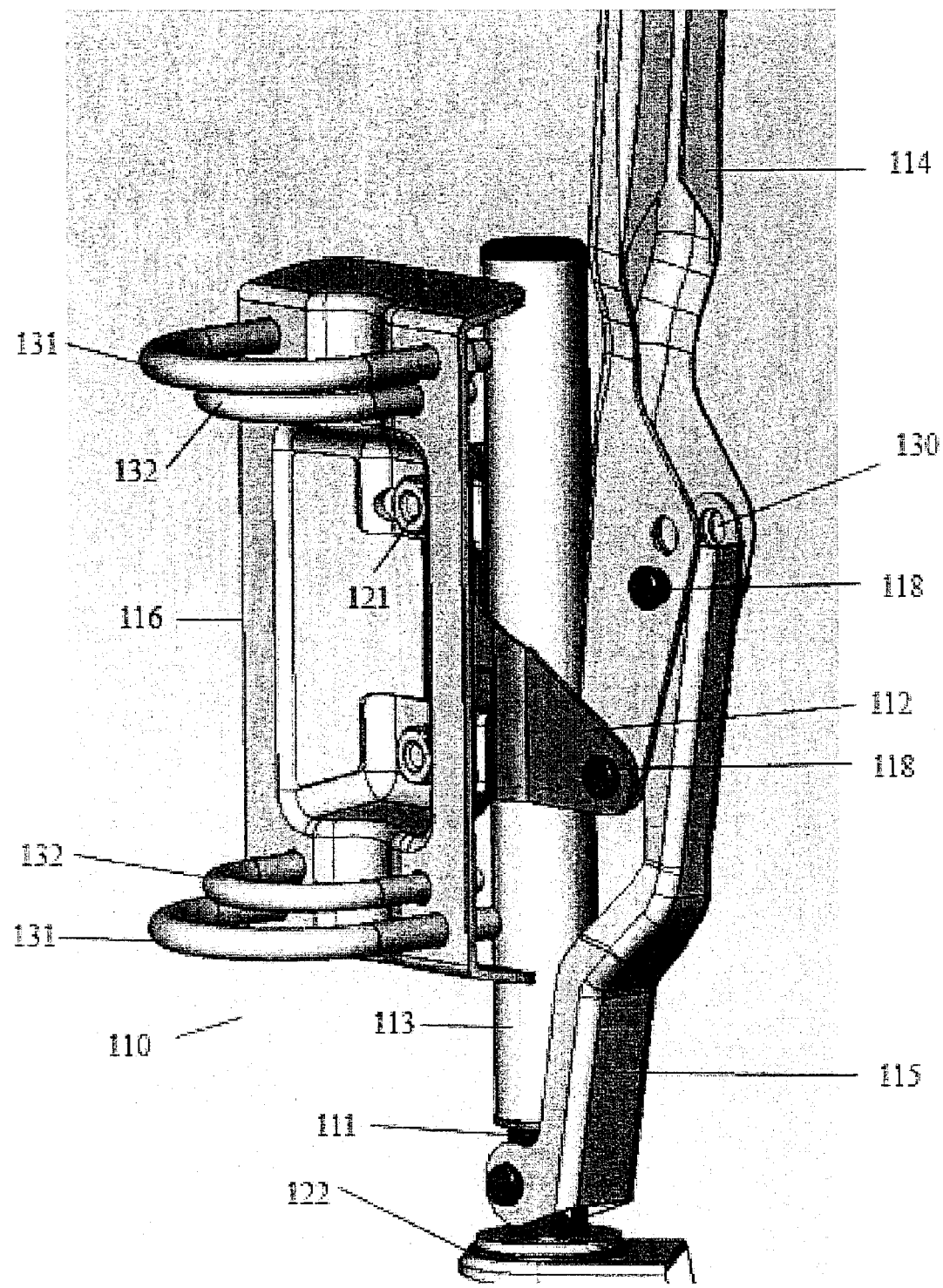
FIG. 14 is a detail rear perspective view of the embodiment shown in FIG. 11 in the wheel up position.

A third embodiment of the pivoting wheel assembly is designated by numeral 110 in FIG. 11. Wheel and pivoting caster assembly 122 is mounted on the end of telescoping tube 111. Tube 111 telescopes inside outer tube 113 which is secured to clamping plate 116 by bolts 121, 125 or the like. Bracket 112 is fastened, for example by welding, to tube 113. Lever handle 114 rotates on pin 118 which is fixed in bracket 112 and second pin 118 which connects lever handle 114 to lever driver 115. The lower end of lever driver 115 rotates on pin 119 in tube 111. Clamping plate 116 has holes for removably receiving U-shaped clamps 131, 132 (FIG. 14). To accommodate trampoline legs of differing angle, bolt 125 slides in slot 127 in clamping plate 116.

Figure 12:
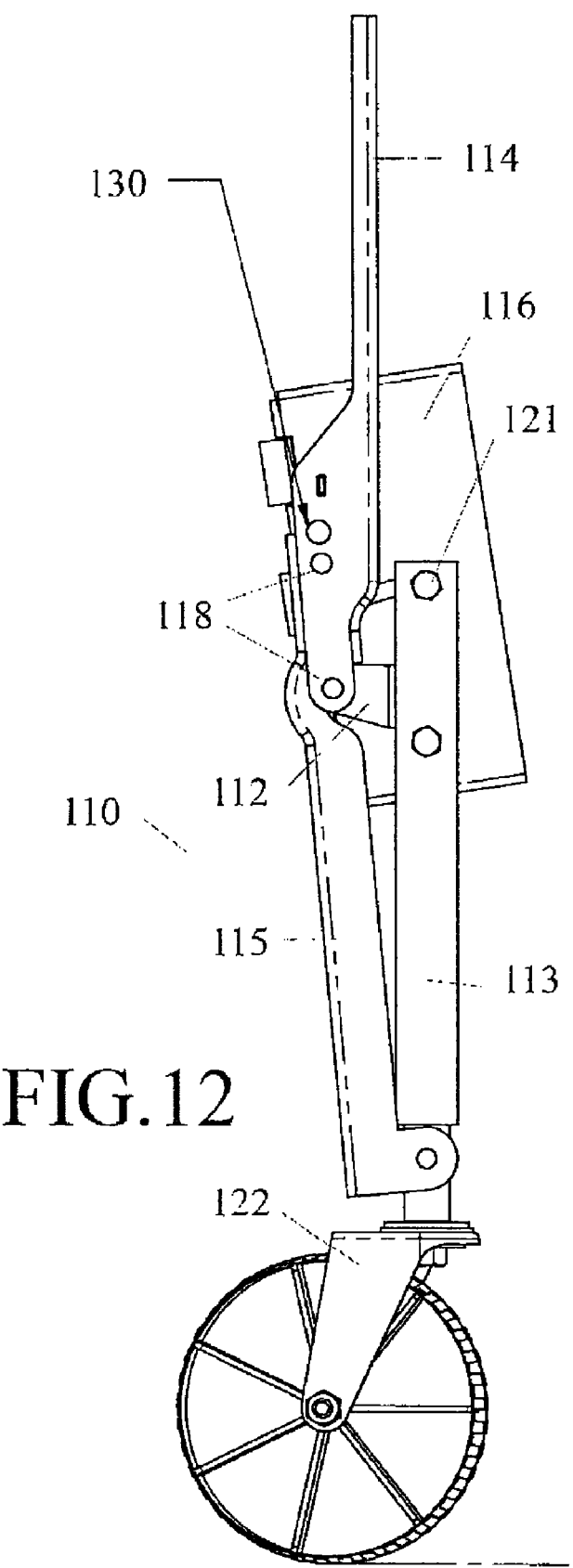
FIG. 12 is a front elevation view of the embodiment shown in FIG. 11 in the wheel up position.

To use this embodiment, as in the first embodiment, with the lever handle 114 in the wheel up position shown in FIG. 12, the clamping plate 116 is secured to trampoline leg 30 at the appropriate height by clamps 131, 132. When it is desired to move the trampoline, the user lowers handle 114 to the position shown in FIG. 13, which lowers wheel and caster 122 into contact with the ground and raises the trampoline leg above the ground. Preferably four wheel assemblies 110 are thus attached to the trampoline legs at four locations and when all the wheels are in the down position the trampoline can be readily rolled to a new location. Padlock hole 130 is provided to permit the assembly to be locked in the wheel up position so that children cannot easily move the trampoline. When it is desired to set the trampoline down for use at a location, the process is reversed by the user rotating handle 114 back ninety degrees to the wheel up position. The wheel assemblies 110 can remain on the trampoline legs in the wheel up position.

Figure 13:
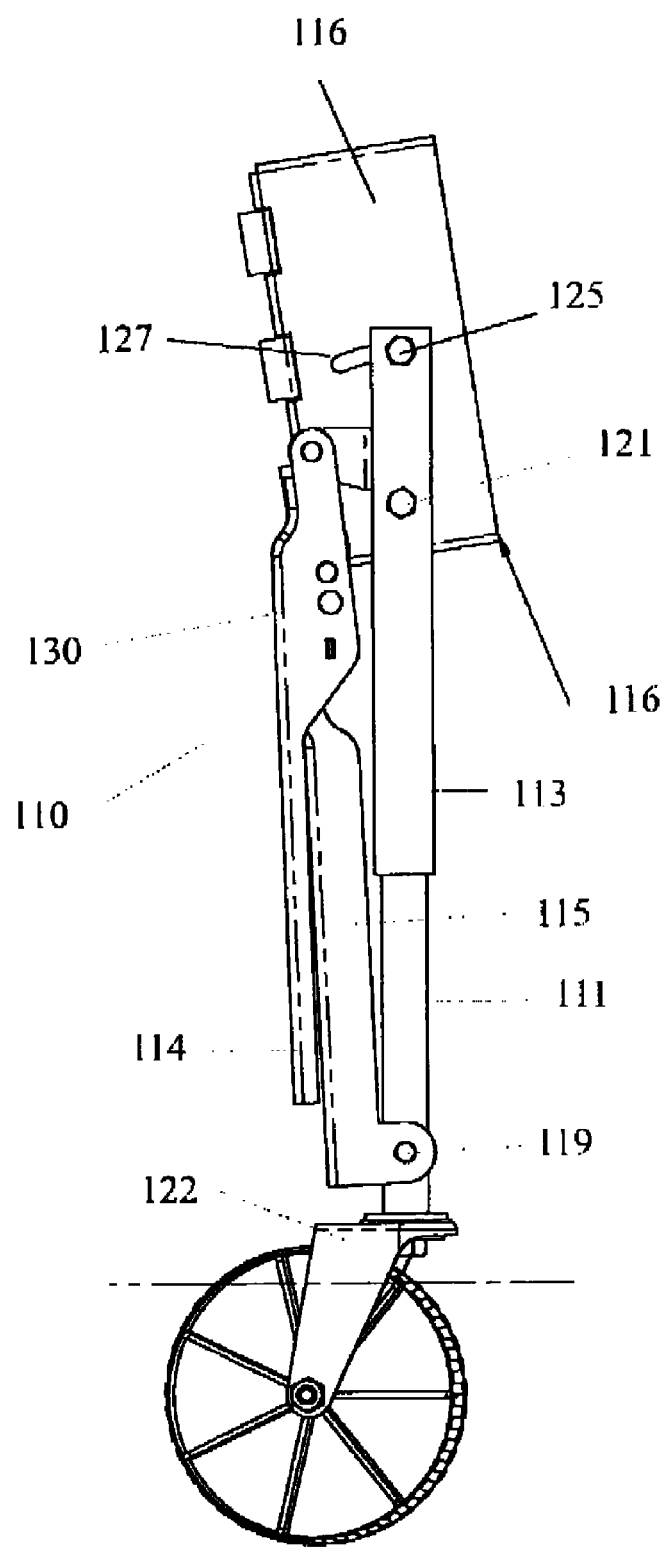
FIG. 13 is a rear elevation view of the embodiment shown in FIG. 11 in the wheel down position.

As will be apparent from FIG. 11-14, the relative location of the axes created by pins 118 to lever driver 115 and pin 119 causes lever handle 114 to reach an over-center point of rotation when rotated to the position shown in FIG. 13 which retains lever handle 114 securely in that position until a rotational force is applied to overcome the resistance created by the over-center relationship and thereby continue rotation of lever handle 114 to the position shown in FIG. 11. Similarly the relative location of the axes created by pins 118 to lever driver 115 and pin 119, and the indentation 123 in the edges of lever driver 115, causes lever handle 114 to reach an over-center point of rotation when rotated to the position shown in FIG. 12 which retains lever handle 114 securely in that position until a rotational force is applied to overcome the resistance created by the over-center relationship and thereby continue rotation of lever handle 114 to the position shown in FIG. 11. In addition, one or more dimples may be formed on the inner surface of handle 114 between the two pins 118, and possibly also corresponding indentations on the outer surface of lever driver 115, to cause a frictional engagement when handle 114 is in the position shown in FIG. 12 in order to further retain lever handle 114 securely in that position until force is applied to rotate it.

Figure 15:
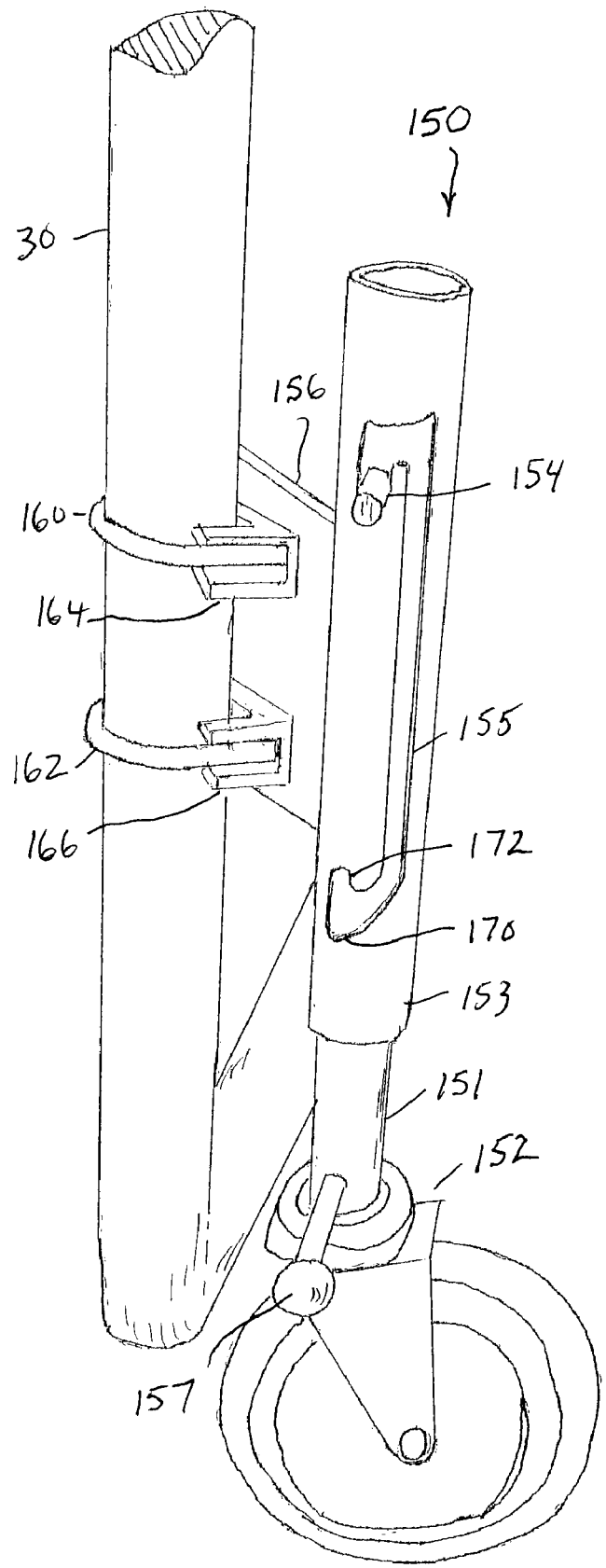
FIG. 15 is a perspective view of a fourth embodiment of the invention shown in the wheel up position.

A fourth embodiment of the pivoting wheel assembly is designated by numeral 150 in FIG. 15. Wheel and pivoting caster assembly 152 is mounted on the end of telescoping inner tube 151. Tube 151 telescopes inside outer tube 153 and has a locking pin 154 and handle 157 secured thereto and extending therefrom. Outer tube 153 has a pin-engaging slot 155 and is secured to mounting plate 156 by welding or the like. Mounting plate 156 has holes for removably receiving U-shaped clamps 160, 162 which have threaded ends which extend through holes in saddle-shaped brackets 164, 166 and are secured using threaded nuts.

Figure 16:
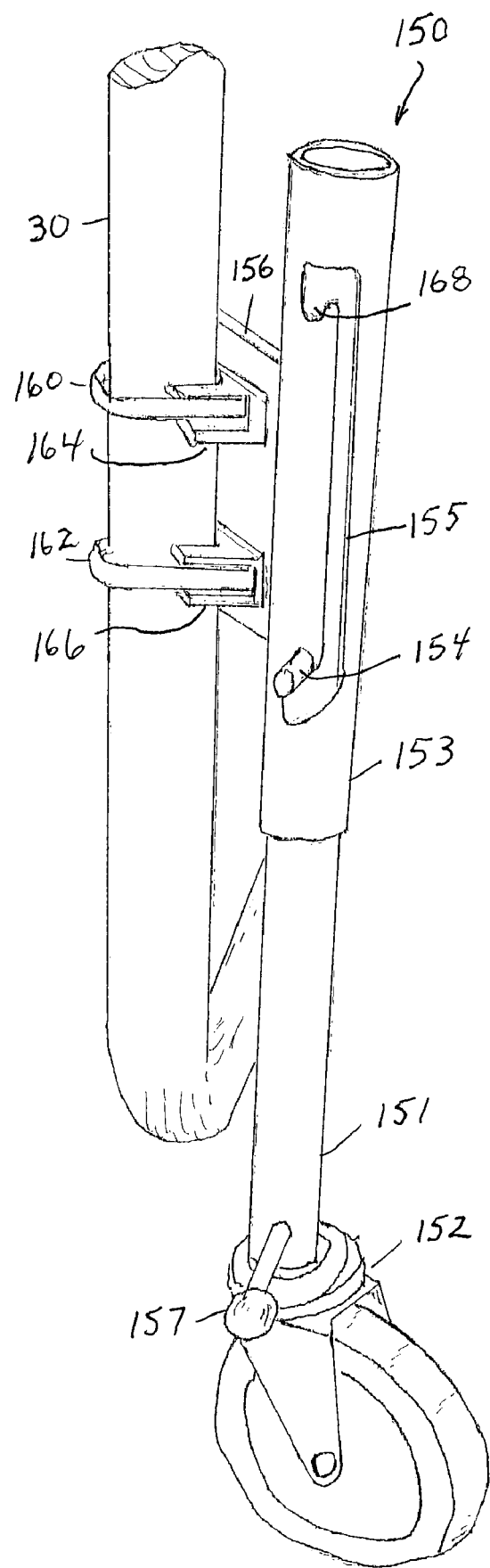
FIG. 16 is a perspective view of the embodiment of the invention shown in FIG. 15 in the wheel down position.
Figures 17A, 17B:
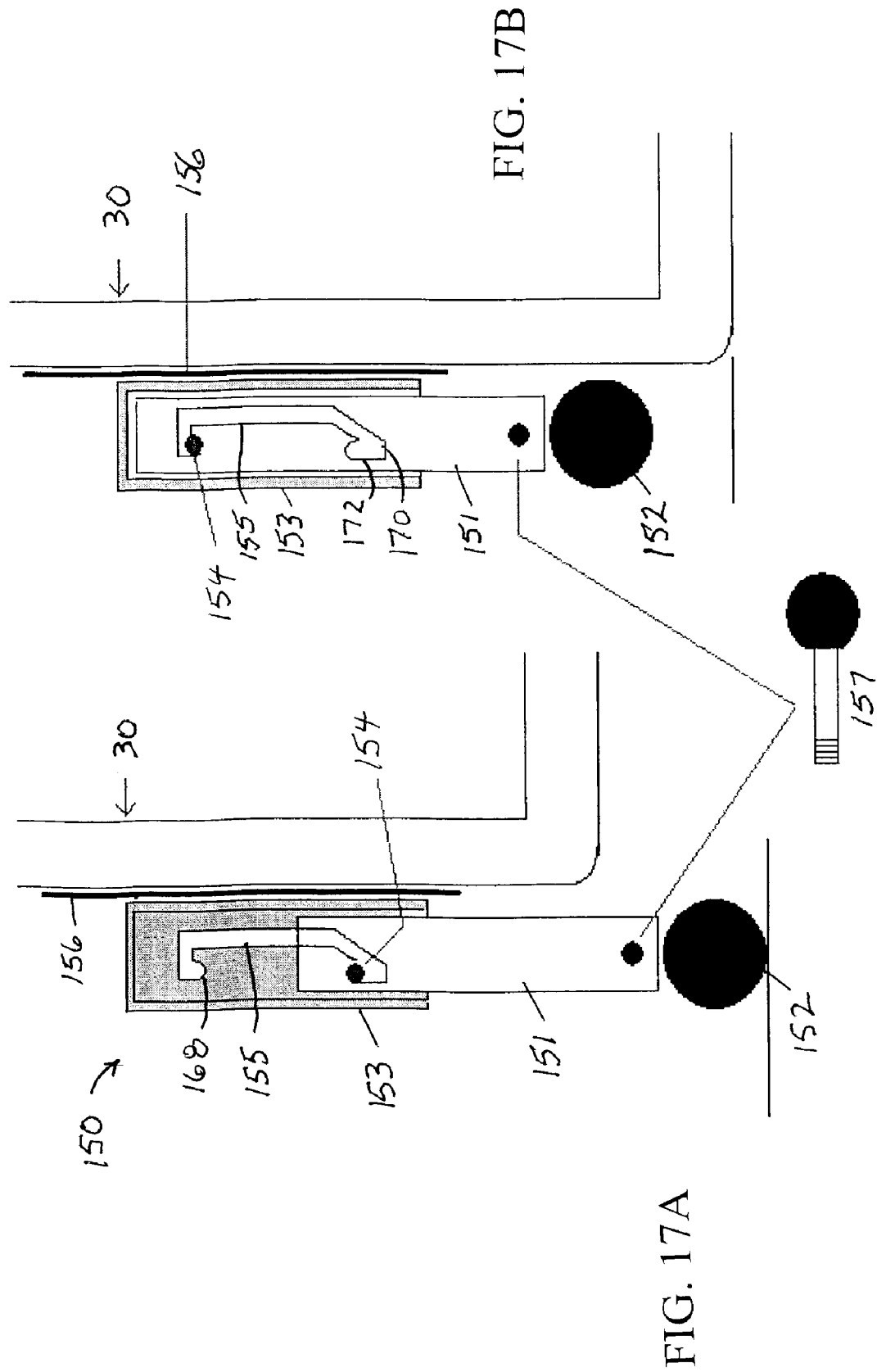
FIGS. 17A, 17B are schematic views in cross-section of the embodiment shown in FIG. 15 illustrating the operation of the locking pin.

To use the device, as shown in FIG. 15, the leg is in the wheel up position shown in FIG. 15 and FIG. 17B, with the locking pin 154 locked in the upper notch 168 of slot 155 due to the weight of the inner tube. The mounting plate 156 is secured to trampoline leg 30 at the appropriate height by tightening clamps 160, 162 and brackets 164, 166 against leg 30. When it is desired to move the trampoline, the user lifts trampoline leg 30 and raises locking pin 154 out of notch 168 using handle 157 to lift inner tube 151, and rotates inner tube 151 counterclockwise, which permits locking pin 154 to enter the vertical length of slot 155. The weight of inner tube 151 and wheel 152 then causes inner tube 151 to telescope downwardly relative to outer tube 153 until locking pin 154 reaches the bottom 170 of slot 155. The trampoline leg 30 is then lowered and supported on wheel 12 above the ground, as shown in FIG. 16 and FIG. 17A with locking pin 154 held in notch 172 by the weight of the trampoline. Preferably a minimum of two or three wheel assemblies 150, and most preferably four wheel assemblies 150 are thus attached to the trampoline legs at spaced locations and when all the wheels are in the down position the trampoline can be readily rolled to a new location. When it is desired to set the trampoline down for use at a location, the process is reversed by lifting the trampoline, thereby returning locking pin 154 to position 170. The user then lifts handle 157 to raise the inner tube 151 in slot 155, and then rotate the locking pin 154 to rest in notch 168. The wheel assemblies 150 can then remain on the trampoline legs in the wheel up position without disturbing the use of the trampoline.

While it is preferred that the wheel assembles according to the invention can be quickly secured to and removed from the trampoline legs such as by using threaded clamps and bolts, the invention can also function wherein the wheel assembly is more permanently secured to the trampoline leg, such as by screwing into the trampoline or welding to the leg.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A wheel assembly for attachment to a trampoline leg to enable a trampoline to be rolled on a surface, comprising:
   i) an attachment element having means for removably securing said wheel assembly to a trampoline leg;
   ii) an elongated hollow tubular element mounted on said attachment element whereby said hollow tubular element is adapted to be removably attached to said trampoline leg wherein the lengthwise axis of said hollow tubular element is parallel to said trampoline leg, said hollow tubular element comprising a slot extending along the lengthwise axis thereof, the lower end of said slot comprising an upwardly extending portion;
   iii) an elongated leg element located coaxially within said hollow tubular element and movable in an axial direction within said hollow tubular element and rotatable about the lengthwise axis of said hollow tubular element;
   iv) a pin element secured to and extending radially from said leg element into said slot in said hollow tubular element;
   iv) handle means attached to said elongated leg element for moving said leg element in an axial direction within said hollow tubular element and rotating said leg element about the lengthwise axis of said hollow tubular element;
   v) an axle-mounted wheel pivotally connected at the lower end of said leg element; whereby said leg element, when attached to said trampoline leg, is movable from a first position wherein said wheel is raised relative to said attachment element and said trampoline leg rests on said surface, to a second position wherein said pin element is held in said lower upwardly turned end of said slot and said wheel is lowered relative to said attachment element into engagement with said surface and said trampoline leg is raised off said surface.

2. The wheel assembly of claim 1 wherein the upper end of said slot extending along the lengthwise axis of said hollow tubular element comprises a downwardly extending portion and said pin element rests in said downwardly extending portion when said wheel is raised relative to said attachment element.

3. The wheel assembly of claim 1 wherein said means for securing said assembly to a trampoline leg comprises removable clamping means.

4. The wheel assembly of claim 1 wherein said removable clamping means comprises threaded fastening means.

5. The wheel assembly of claim 1 wherein said wheel is pivotally mounted by caster means.

6. A plurality of wheel assemblies as claimed in claim 1 in combination with a trampoline.

7. Two wheel assemblies as claimed in claim 1 in combination with a trampoline.

8. Three wheel assemblies as claimed in claim 1 in combination with a trampoline.

9. Four wheel assemblies as claimed in claim 1 in combination with a trampoline.

10. A wheel assembly for attachment to a trampoline leg to enable a trampoline to be rolled on a surface, comprising:
    i) an attachment element having means for securing said wheel assembly to a trampoline leg;
    ii) an elongated element mounted on said attachment element and movable in a direction having a component perpendicular to said surface when said wheel assembly is attached to said trampoline;
    wherein said elongated element comprises a first tube which moves in an axial direction on a second coaxial tube and said means for reversibly moving said elongated element from a first position to a second position comprises a handle pivotally connected to said elongated element and pivotally connected to a connecting element which in turn is pivotally connected to said second tube, whereby said elongated element is selectively secured in said first or second positions;
    iii) an axle-mounted wheel pivotally connected to said second tube; and iv) means for reversibly moving said elongated element from a first position in which said wheel is raised relative to said attachment element and when attached to said trampoline leg said trampoline leg rests on said surface, to a second position in which said wheel is lowered relative to said attachment element into engagement with said surface and said trampoline leg is raised off said surface.

11. The wheel assembly of claim 10 wherein said elongated element is secured in said first or second positions by an over-center relationship of said elongated element to said connecting element.

12. The wheel assembly of claim 11 wherein said wheel is pivotally mounted by caster means to the lower end of said second tube.

13. A plurality of wheel assemblies as claimed in claim 10 in combination with a trampoline.

14. Two wheel assemblies as claimed in claim 10 in combination with a trampoline.

15. Three wheel assemblies as claimed in claim 10 in combination with a trampoline.

16. Four wheel assemblies as claimed in claim 10 in combination with a trampoline.

* * * * *